United States Patent [19]
Brewer et al.

[11] 3,858,697
[45] Jan. 7, 1975

[54] VISCOUS FLUID CLUTCH WITH SUPPLEMENTING CENTRIFUGAL CLUTCH
[75] Inventors: Robert W. Brewer; Danny R. Phillips, both of Dayton, Ohio
[73] Assignee: General Motors Corporation, Detroit, Mich.
[22] Filed: Dec. 10, 1973
[21] Appl. No.: 423,140

[52] U.S. Cl. ............... 192/58 B, 192/48.1, 192/57, 192/82 T, 192/105 CD, 123/41.12
[51] Int. Cl. ..... F16d 31/08, F16d 43/24, F01p 7/02
[58] Field of Search .......... 192/58 B, 82 T, 105 CD, 192/57, 83, 48.1; 123/41.12

[56] References Cited
UNITED STATES PATENTS

| | | | |
|---|---|---|---|
| 2,172,089 | 9/1939 | Peone | 192/57 |
| 2,512,438 | 6/1950 | Ranzi | 192/58 B |
| 2,789,674 | 4/1957 | Zahradnik et al. | 192/105 CD |
| 3,170,552 | 2/1965 | Mitchell | 192/58 B |
| 3,366,097 | 1/1968 | Ferris et al. | 192/48.1 |
| 3,517,650 | 6/1970 | Seifert | 123/41.12 |
| 3,690,428 | 9/1972 | LaFlame | 192/58 B |

Primary Examiner—Samuel Scott
Assistant Examiner—Lance W. Chandler
Attorney, Agent, or Firm—John P. Moran

[57] ABSTRACT

A clutch including centrifugal clutch means operable between the housing and the enclosed clutch plate, supplementing conventional viscous fluid shear drive means, to maintain substantially an initial 1:1 or non-slip drive relationship therebetween at low engine rpms or idle conditions, thereby effectuating high fan speed during such conditions.

4 Claims, 4 Drawing Figures

PATENTED JAN 7 1975 3,858,697

VISCOUS FLUID CLUTCH WITH SUPPLEMENTING CENTRIFUGAL CLUTCH

This invention relates generally to viscous fluid clutches and, more particularly, to a viscous fluid clutch having centrifugal clutch means associated therewith.

In many vehicular engine applications it is highly beneficial to have the engine cooling fan operating at full capacity during idle or low engine rpm conditions, for example, to extend the time period that it would take to overheat the engine when the vehicle is stopped. This can be accomplished by incorporating spring-loaded drive means in a viscous fluid clutch, operable between the driving and driven elements at relatively low input speeds. U.S. Pat. No. 2,963,135 Weir discloses one means for accomplishing such a result in a fluid coupling, i.e., by incorporating therein a drive plate formed of relatively thin metal stock having some resiliency and being radially slotted to provide a series of spaced fingers which alternately extend in opposite directions out of the plane of the drive plate.

An object of this invention is to provide a viscous fluid clutch supplemented by improved centrifugal clutch means for providing a substantially nonslip drive relationship between the relatively rotatable housing and enclosed clutch plate until a predetermined fan speed, say, 1250 rpm, has been reached, after which the conventional viscous shear drive characteristics become operable in the usual manner.

Another object of the invention is to provide an improved viscous fluid clutch including a centrifugal clutch arrangement operable between the clutch housing and the outer peripheral edge portion of the clutch plate rotatably mounted in the shear drive operating chamber.

A further object of the invention is to provide a viscous fluid clutch including a conventional housing, annular working chamber and accompanying clutch plate, and viscous shear drive means, with centrifugal clutch means operatively connected between the housing and the outer peripheral portion of the clutch plate, the centrifugal clutch means including one or more centrifugal weights pivotally mounted by pivot pins on the radial outer edge of the clutch plate, and cooperating leaf springs, each secured at one end thereof to the clutch plate adjacent the centrifugal weights, with the other ends thereof extending therefrom so as to contact respective end portions of the centrifugal weights, maintaining substantially a direct drive relationship between the housing and the clutch plate until a predetermined output speed is reached, at which point the weights will compress the springs to disconnect the direct drive relationship and permit the conventional viscous shear drive means to become effective.

These and other objects and advantages of the invention will be apparent when reference is made to the following description and accompanying drawings, wherein.

Figure 1:
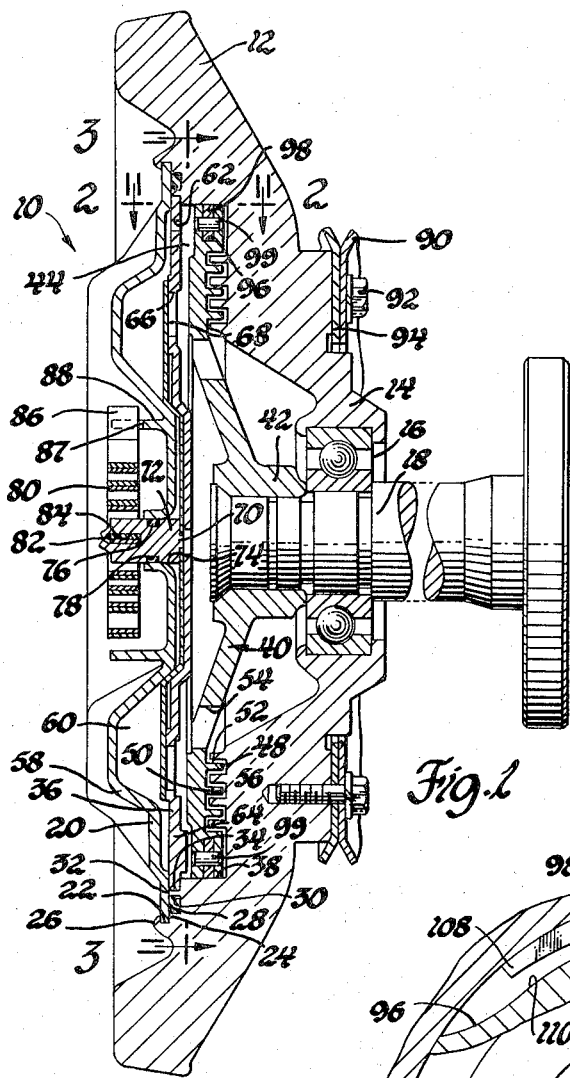
FIG. 1 is a cross-sectional view of a viscous fluid clutch embodying the invention.
Figure 2:
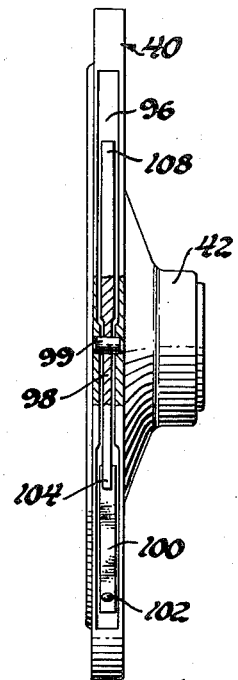
FIG. 2 is an end view of a component of the FIG. 1 structure, taken along the plane of line 2—2 of FIG. 1, and looking in the direction of the arrows.

Referring to the drawings in greater detail, FIG. 1 illustrates a viscous fluid clutch 10 including a housing or output member 12 having a hub 14 which is rotatably mounted by a suitable bearing 16 on a drive shaft 18. A contoured cover member 20 is mounted in an annular recess 22 formed in a face of the housing 12. The cover member 20 is formed to include an annular flat surface 24 adjacent its outer peripheral edge, the latter being confined by an annular lip 26 of the housing 12 in the annular recess 22. A seal 28 is compressed by the flat surface 24 of the cover member 20 in an annular groove 30 formed in the bottom surface 32 of the recess 22.

A second annular recess 34 is formed in the housing 12 radially inward of the outer periphery of the annular recess 22. A divider wall 36 is confined adjacent its outer edge in the second recess 34 by the cover member 20. A third annular deeper recess 38 is formed in the housing 12 radially inward of the second annular recess 34. A clutch plate 40 is secured at a center hub 42 thereof by any suitable means to the drive shaft 18, the outer peripheral portion of the clutch plate 40 being freely located in the operating or working chamber 44 provided by the formation of the third annular recess 38.

Adjacent portions of the clutch plate 40 and the rear wall of the housing 12 are formed to include cooperating ridge and groove elements 48 and 50, respectively, with an intervening fluid shear space 52 therebetween to accommodate a viscous fluid, such as silicone fluid, serving as a torque-transmitting medium.

The clutch plate 40 further includes a plurality of equispaced openings 54 formed therein at a point radially inward from the ridge and groove elements 48 and 50. A pair of oppositely disposed smaller openings 55 (FIG. 3) are formed in the clutch plate 40 adjacent the outermost edge thereof, one of which is illustrated as being radially aligned with one of the larger openings 54, but such need not be the case. A pair of radial grooves, such as V-shaped grooves 56, are formed in the clutch plate 40 across the ridges 48 and terminating at the openings 55. The grooves 56 assist in the process of filling and removing the fluid medium operative in the working chamber 44.

The front wall or cover member 20 includes an annular contoured portion 58 intermediate the center and peripheral edges thereof which forms an annular reservoir 60 with the divider wall 36. One or more pump outlet openings 62 are formed through the divider wall 36 circumferentially adjacent pump or dam elements 64 formed on the divider wall 36, and at substantially the same radial distance from the center of the clutch 10 as the outer clutch plate openings 55. The pump outlet openings 62 communicate between the working chamber 44 and the annular reservoir 60. The pump or dam elements 64 serve as wipers which force the fluid medium to flow from the working chamber 44, through the respective pump outlet openings 62 into the annular reservoir 60, in the well-known manner. The elements 64 may consist of a circular boss formed on the divider wall 36 by any suitable means, such as stamping, or it may be a rectangular-shaped or other-shaped member secured to the divider wall, such as by welding. It is to be understood that, in some applications, one outlet and one pump element may be sufficient, while other applications may require two such pumping arrangements. In the latter instance, one of the outlet openings 62 may at times be closed by an internal bimetallic valve (not shown).

One or more inlet ports 66 are also formed in the divider wall 36, communicating between the annular reservoir 60 and the working chamber 44 radially inward of the pump elements 64 and the pump outlet openings 62. The inlet port 66 is at times closed off by a valve member 68, which is responsive to selected parameters, such as temperature changes or centrifugal force. The valve member 68 is illustrated as being secured in any suitable manner to a reduced-diameter portion 70 of a center pin or shaft 72, which is rotatably mounted in a central opening 74 formed in the front wall of cover member 20. A seal ring 76 may be mounted in an annular groove 78 formed in the pin 72 within the central opening 74 to prevent leakage therepast. A suitable bimetallic thermostatic valve control element 80 is provided with an inwardly extending end-portion 82 which is mounted in a transverse slot 84 formed in the pin 72. An outwardly extending end-portion 86 of the bimetallic element 80 is restrained by virtue of being inserted in a slot 87 formed in a post 88. With this arrangement, a change in ambient temperature either winds or unwinds the bimetallic element 80, resulting in rotation of the pin 72 and the valve member 68, to thus control the flow of fluid medium from the reservoir 60 through the inlet port 66 to the working chamber 44 in the well-known manner.

As is well known to those skilled in the fluid clutch art, normally, upon rotation of the clutch plate 40 by the input shaft 18, torque is transmitted to the adjacent housing or output member 12 by the fluid shear action of the fluid medium in the operating chamber 44. Rotation of the output member or housing 12 effects rotation of a cooling fan 90 secured by bolts 92 to a mounting surface 94 formed on the housing 12, the speed thereof being determined by the volume of fluid medium in the chamber 44.

Oppositely disposed arcuate slots or pockets 96 are formed on the outer peripheral edge of the clutch plate 40, substantially intermediate the openings 55. One or more centrifugal weights 98 are pivotally mounted by pivot pins 99 in the respective pockets 96. A leaf spring 100 is also mounted in each pocket 96 and secured therein by a screw 102 mounted through one end thereof, with the other end thereof extending tangentially therefrom into contact with an end-portion 104 of each centrifugal weight 98, urging each of such end-portions 104 into respective notches 105 formed in the housing 12, such that each end-portion 104 abuts against a shoulder 106 formed at one end of each notch 105, and further urging the other end-portion 108 of each centrifugal weight 98 into contact with respective adjacent surfaces 110 of the annular pockets 96, as illustrated in the lower portion of FIG. 3. While in this position, a direct drive between the clutch plate 40 and the housing 12 will, of course, occur.

Figure 3:
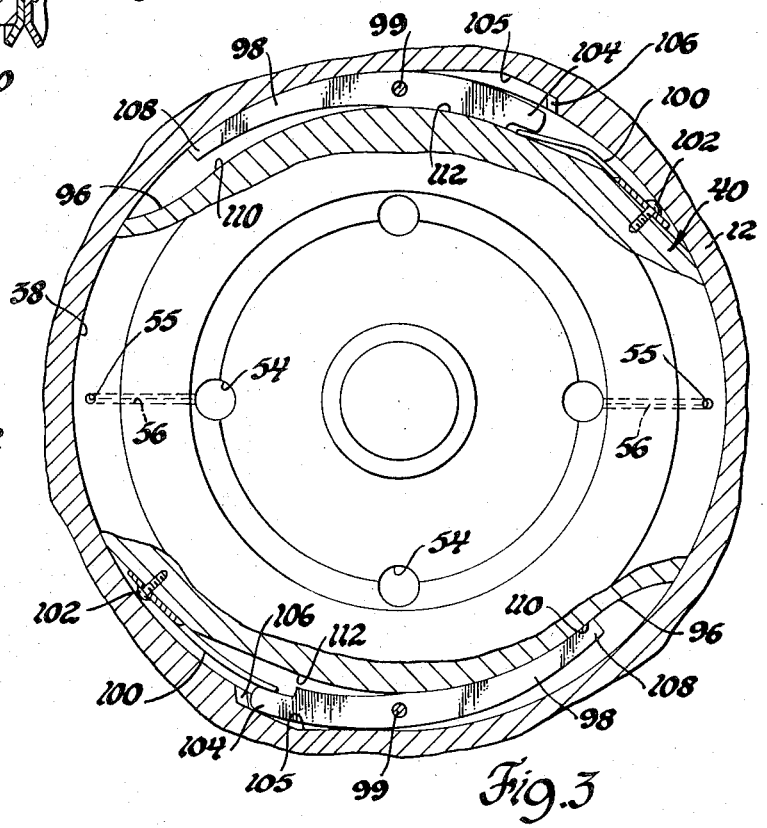
FIG. 3 is a fragmentary cross-sectional view taken along the plane of line 3—3 of FIG. 1, and looking in the direction of the arrows.

It may be realized that, at some predetermined output or fan speed not otherwise obtainable via fluid shear drive at the low speed conditions, centrifugal force will urge the heavier end-portions 108 of each weight 98 outwardly away from the clutch plate surface 110 against the force of the spring 100, freeing the end-portions 104 from the respective shoulders 106 and bringing each end-portion 104 into contact with respective adjacent surfaces 112 of the annular pockets 96, as illustrated in the upper portion of FIG. 3, to thereafter permit the viscous shear drive effect of the ridge-and-groove-type shear spaces 52 to become operable in the usual manner.

It should be noted that the shoulders 106 may be tapered as required to facilitate the sliding release therefrom of the respective end-portions 104 once the heavier end-portions 108 begin moving outwardly under the action of centrifugal force.

It should be apparent that the invention provides an improved viscous fluid clutch including the usual shear drive arrangement along with efficient and compact centrifugal clutch means for assuring a high fan speed until a predetermined output or fan speed is reached, thus, extending the time period that it would take to overheat the engine when the vehicle is stopped.

Figure 4:
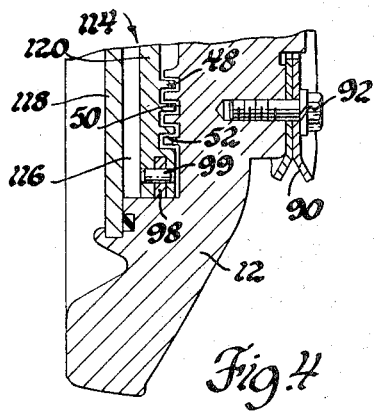
FIG. 4 is a fragmentary cross-sectional view of a viscous fluid coupling embodying the invention.

It should also be realized that, while a working chamber and adjacent reservoir chamber, with pump means and valve means operable therebetween have been illustrated and described, the centrifugal clutch arrangement shown in FIG. 1 could be associated with the viscous fluid coupling 114 illustrated in FIG. 4, including only a working chamber 116 formed between the housing 12 and a flat cover member 118 and which retains the viscous fluid at all times, providing a slipping-type coupling for variably limiting the torque transfer between the engine and the fan with speed changes. If desired, the clutch plate 120 could be formed to include flat parallel faces with predetermined shear space on both sides thereof, without the benefit of the cooperative ridges and grooves illustrated.

It should also be apparent that, should there be a need, for example, for accessory drive applications other than cooling fans, the centrifugal clutch arrangement of the invention could be included in a viscous fluid clutch or coupling wherein the input and output means are reversed, i.e., wherein the housing serves as the input member by virtue of associated pulley means, and the central shaft serves as the output member.

While but one general embodiment of the invention has been shown and described, other modifications thereof are possible.

I claim:

1. A viscous fluid drive mechanism comprising first and second relatively rotatable drive means, said first drive means being rotatably mounted by bearings on a central shaft and having an annular chamber formed therein, said second drive means being secured to said central shaft and extending radially outwardly into said annular chamber so as to provide a predetermined shear space intermediate said first and second drive means, said shear space being operable with a fluid medium to provide a shear-type fluid drive between said first and second drive means, a pair of oppositely disposed slots formed in said first drive means radially outwardly from said second drive means and including a shoulder formed at one end of each of said slots, a pair of oppositely disposed arcuate-shaped pockets formed in the outer peripheral edge of said second drive means, a centrifugal weight member pivotally mounted at an intermediate but off-center point thereof in each of said pockets, and resilient means mounted in each of said pockets for urging the adjacent lighter end of said respective centrifugal weight members radially outwardly into said respective slots for contacting said respective shoulders so as to produce a direct mechanical drive relationship between said first and second drive means until such time as the heavier end of said respective centrifugal weight members pivots radially outwardly under the action of the centrifugal force, thereby releasing said lighter ends of said centrifugal weight members from said respective shoulders and permitting said shear-type fluid drive to become effective.

2. A viscous fluid drive mechanism comprising first and second relatively rotatable drive means, said first drive means being rotatably mounted by bearings on a central shaft and having an annular chamber formed therein, said second drive means being secured to said central shaft and extending radially outwardly into said annular chamber so as to provide a predetermined shear space intermediate said first and second drive means, said shear space being operable with a fluid medium to provide a shear-type fluid drive between said first and second drive means, a pair of oppositely disposed slots formed in said first drive means radially outwardly from said second drive means and including a shoulder formed at one end of each of said slots, a pair of oppositely disposed arcuate-shaped pockets formed in the outer peripheral edge of said second drive means, a centrifugal weight member pivotally mounted at an intermediate but off-center point thereof in each of said pockets, and a leaf spring secured at one end thereof in each of said pockets and extending toward said respective centrifugal weight members for urging the adjacent lighter end of said respective centrifugal weight members radially outwardly into said respective slots for contacting said respective shoulders so as to produce a direct mechanical drive relationship between said first and second drive means until such time as the heavier end of said respective centrifugal weight members pivots radially outwardly under the action of centrifugal force, thereby releasing said lighter ends of said centrifugal weight members from said respective shoulders and permitting said shear-type fluid drive to become effective.

3. A viscous fluid clutch comprising first and second relatively rotatable drive means, said first drive means being rotatably mounted by bearings on a central shaft and having an annular chamber formed therein, said second drive means being secured to said central shaft within said annular chamber, a plurality of annular ridges formed on one of said first and second drive means and a plurality of cooperating annular grooves formed on the other of said first and second drive means in said annular chamber, said annular ridges and grooves forming a shear space therebetween and operable with a fluid medium to provide a shear-type fluid drive between said first and second drive means, a pair of oppositely disposed slots formed in said first drive means radially outwardly from said second drive means and including a shoulder formed at one end of each of said slots, a pair of oppositely disposed arcuate-shaped pockets formed in the outer peripheral edge of said second drive means, a centrifugal weight member pivotally mounted at an intermediate but off-center point thereof in each of said pockets, and a leaf spring secured at one end thereof in each of said pockets and extending toward said respective centrifugal weight members for urging the adjacent lighter end of said respective centrifugal weight members radially outwardly into said respective slots for contacting said respective shoulders so as to produce a direct mechanical drive relationship between said first and second drive means until such time as the heavier end of said respective centrifugal weight members pivots radially outwardly under the action of centrifugal force, thereby releasing said lighter ends of said centrifugal weight members from said respective shoulders and permitting said shear-type fluid drive to become effective.

4. A viscous fluid clutch comprising a housing rotatably mounted by bearings on a central shaft and having a working chamber and an adjacent reservoir chamber formed therein, a divider wall sealed between said working chamber and said reservoir chamber, a clutch plate secured to said central shaft within said working chamber, a plurality of annular ridges formed on one of said housing and said clutch plate and a plurality of cooperating annular grooves formed on the other of said housing and said clutch plate in said working chamber, said annular ridges and grooves forming a shear space therebetween and operable with a fluid medium to provide a shear-type fluid drive between said housing and said clutch plate, said divider wall having outlet opening means formed in an outer radial portion thereof and inlet opening means formed at an inner radial portion thereof, pump means formed on one of said divider wall and clutch plate to pump said fluid medium from said working chamber through said outlet opening means into said reservoir chamber, temperature-responsive valve means operatively connected to said inlet opening means for controlling the flow of said fluid medium from said reservoir chamber through said inlet opening means into said working chamber in response to changes in ambient temperature, a pair of oppositely disposed slots formed in said housing radially outwardly from said clutch plate and including a shoulder formed at one end of each of said slots, a pair of oppositely disposed arcuate-shaped pockets formed in the outer peripheral edge of said clutch plate, a centrifugal weight member pivotally mounted at an intermediate but off-center point thereof in each of said pockets, and a leaf spring secured at one end thereof in each of said pockets and extending toward said respective centrifugal weight members for urging the adjacent lighter end of said respective centrifugal weight members radially outwardly into said respective slots for contacting said respective shoulders so as to produce a direct mechanical drive relationship between said clutch plate and said housing until such time as the heavier end of said respective centrifugal weight members pivots radially outwardly under the action of centrifugal force, thereby releasing said lighten ends of said centrifugal weight members from said respective shoulders and permitting said shear-type fluid drive to become effective.

* * * * *